G. O. GRIDLEY.
METAL WORKING MACHINE.
APPLICATION FILED APR. 13, 1914.

1,166,126.

Patented Dec. 28, 1915.
3 SHEETS—SHEET 1.

Witnesses:

Inventor
G. O. Gridley

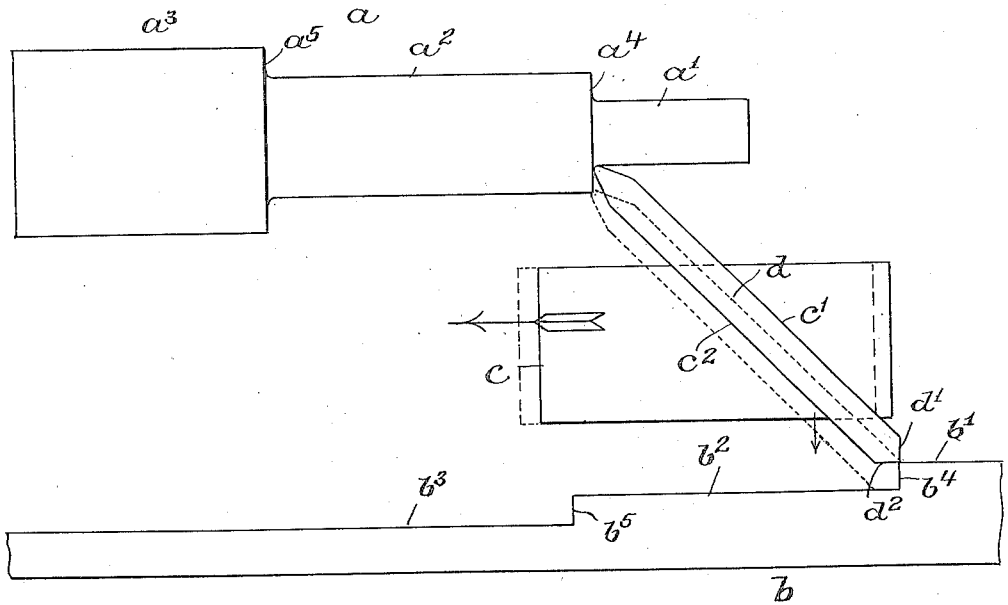
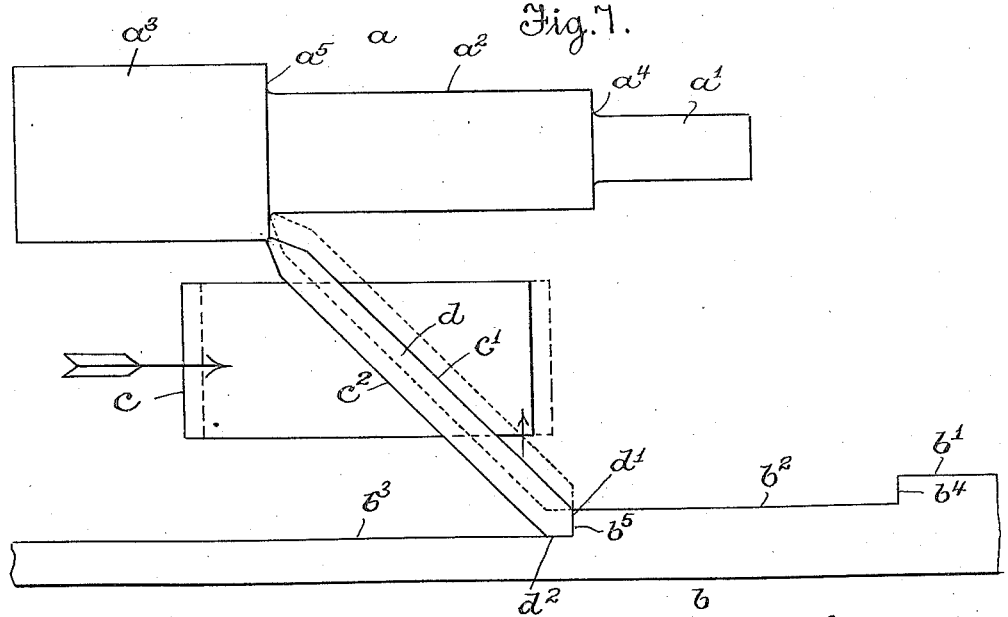

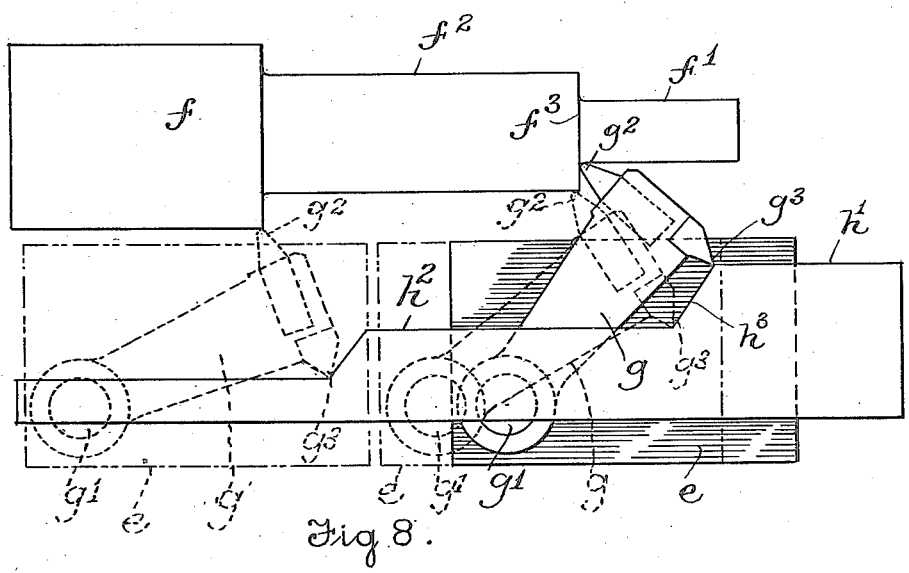

UNITED STATES PATENT OFFICE.

GEORGE O. GRIDLEY, OF WINDSOR, VERMONT.

METAL-WORKING MACHINE.

1,166,126.

Specification of Letters Patent. Patented Dec. 28, 1915.

Application filed April 13, 1914. Serial No. 831,624.

*To all whom it may concern:*

Be it known that I, GEORGE O. GRIDLEY, a citizen of the United States, and a resident of Windsor, in the county of Windsor and State of Vermont, have invented certain new and useful Improvements in Metal-Working Machines, of which the following is a specification.

This invention has relation to metal working machines in which the operation of the tool is controlled by a templet relatively to which the tool is moved by a carriage.

Broadly speaking, the invention resides in a relative arrangement of the tool and the templet with respect to the work, which results in the possibility of reducing peripheral portions of different diameters and the face portions of the work between said peripheral portions by the employment of a single tool.

I have discovered that, by arranging the tool or its holder to move upon the carriage at an acute angle to the templet and to the axis of the work, the cutter may be caused to perform both turning and facing operations and thus to reduce shouldered work with as great ease and facility as though the work were of unvarying diameter save as reduced by the cutter.

Broadly stated, the invention comprises, in addition to means for holding the work, a templet arranged longitudinally of the work, a tool slide, and a templet-controlled tool movable on said slide at an acute angle to the templet.

Figure 1:
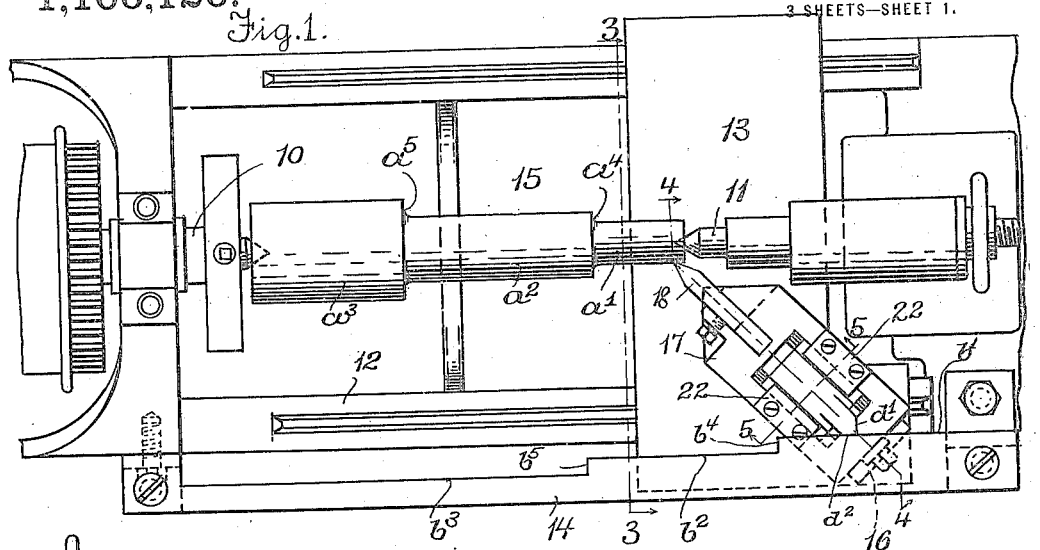
Figure 2:
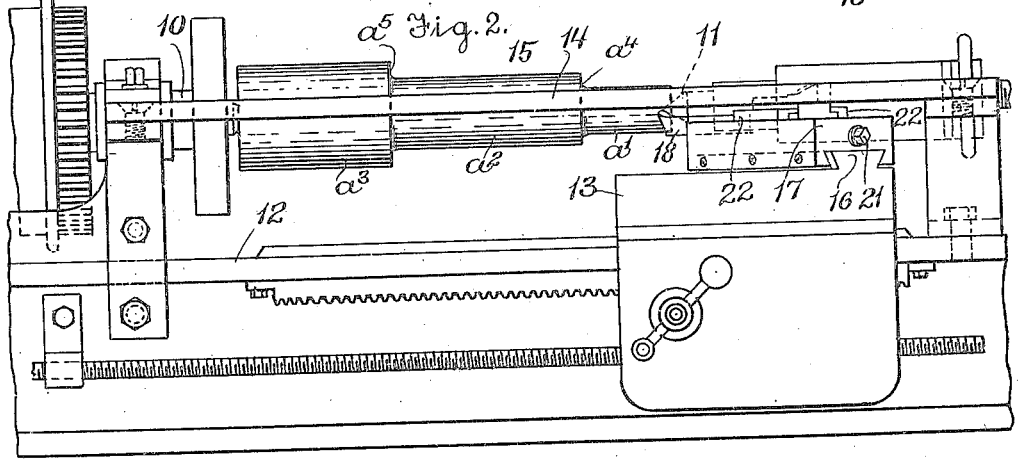
Figure 3:
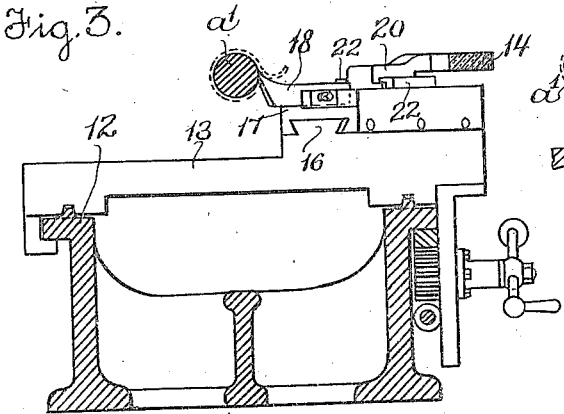
Figure 4:
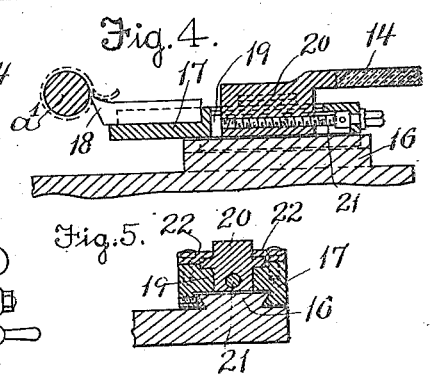
Figure 5:

On the accompanying drawings,—Figure 1 illustrates in plan view my invention as embodied in an engine lathe. Fig. 2 represents a front side elevation of the lathe. Fig. 3 represents a section on the line 3—3 of Fig. 1. Fig. 4 represents a section on the crooked line 4—4 of Fig. 1. Fig. 5 represents a section on the line 5—5 of Fig. 1. Figs. 6 and 7 represent conventionally and diagrammatically the operation of the templet-controlled tool. Fig. 8 represents conventionally and diagrammatically another embodiment of the invention.

I will first explain the principles of the operation of my invention and then describe one practical form in which the invention may conveniently be embodied.

Referring to Figs. 6 and 7, the work is indicated at $a$, the stationary templet which is longitudinal of the work at $b$, the tool slide at $c$, and the tool or cutter at $d$. The tool slide is supposed to reciprocate or be fed in lines parallel to the axis of the work, and the work is presumed to be rotated about its axis. The work has the peripheral portions $a'$, $a^2$ and $a^3$, and faces or shoulders $a^4$, $a^5$ between the cylindrical portions. The templet, which is mounted rigidly, has longitudinal faces $b'$, $b^2$ and $b^3$, and transverse perpendicular faces or shoulders $b^4$, $b^5$ all corresponding in length to those to be formed on the work. The cutter $d$ is shown as arranged to slide in a guideway which intersects the axis of the work, and the path of movement of the slide $c$ at acute angle, say 45°, so that the walls of the slot or guideway form wedging faces $c'$ $c^2$ in engagement with the sides of the cutter. The inner end of the cutter has a nose adapted to remove chips from the peripheral and face portions of the work, and the outer end has two faces $d'$ $d^2$ which are parallel respectively to the perpendicular and longitudinal faces of the templet. The nose or inner end of the cutter is in operative engagement with the work and the thrust tends to force the cutter rearwardly. This rearward thrust is met by the templet against which the outer end of the cutter abuts. When the carriage is moving in the direction of the arrow in Fig. 6 and while the cutter is reducing the diameter of the peripheral portion $a'$ of the work, any outward movement of the cutter is resisted by the face $b'$ of the templet with which the end face $d^2$ of the cutter is engaged. As soon as the cutter reaches a point where the end face $d^2$ slides off the end of the face $b'$ of the templet, the thrust of the work tends to stop further advancing movement of the cutter with the slide $c$. The slide continues to move, however, and, as the tool is held by the work against movement longitudinally thereof, the wall or face $c'$ wedges the tool bodily laterally and in effect forces it rearwardly and outwardly relatively to the slide. This rearward and outward movement, however, is controlled by the perpendicular face $b^4$ of the templet which is now engaged by the tool end face $d'$, so that the point or nose of the tool, as a result, moves outward in a line parallel to the templet face $b^4$, and removes the metal from the face $a^4$ of the work. As soon as the tool face $d^2$ engages the templet face $b^2$, the tool ceases its movement relatively to the slide, and the continued feeding movement of the slide causes the tool to slide along the templet face $b^2$ and its nose or point to reduce the cylindrical portion $a^2$ of the work. In like manner, the tool cuts away the face $a^5$ of the work when the tool has reached the end of the templet face $b^2$. When the slide is fed in the opposite direction, as shown in Fig. 7, the outer end of the tool travels along the templet face $b^3$, reducing the diameter of the portion $a^3$ of the work, until the end face $d'$ engages the perpendicular templet face $b^5$. Thereupon the bodily movement of the tool lengthwise of the work axis ceases, and the wedge wall $c^2$ of the slide $c$ causes the tool to be moved bodily inwardly in lines parallel to said face $b^5$ so as to cut away the face $a^5$ of the work. As soon, however, as the corner on the end of the tool clears the upper end of the face $b^5$, the bodily inward movement of the tool ceases, and the tool thereafter slides along on the face $b^2$ of the templet. Hence, in both the forward and rearward movements of the tool slide, the tool is held against the work by the templet, and has alternating bodily movements in intersecting paths, or in lines parallel to the faces of the templet. It is obvious that what I have termed the perpendicular faces $b^4$, $b^5$ of the templet need not in fact be at an angle of 90° to the faces $b'$, $b^2$, $b^3$, but may be at any angle within reason to correspond to the face to be formed on the work.

In Fig. 8, I have conventionally shown another form of the invention in which the tool has a curvilinear movement instead of a rectilinear movement. In this case, the tool has a lateral arm which is pivoted upon the slide, and the templet is constructed to compensate for its swinging movement, in the formation of an abrupt shoulder on the work. The tool slide $e$ reciprocates longitudinally of the axis of the work $f$, and has pivoted thereto at $g'$ the lateral arm $g^4$ of the tool $g$. One end of the tool is provided with a cutter $g^2$, and the other end with an abutment $g^3$ to engage the templet $h$. The work is to be turned with the cylindrical or peripheral portions $f'$ $f^2$ and with the face or shoulder $f^3$. Inasmuch as the tool is pivoted on a pivot on the slide, the line connecting the point of the cutter $g^2$ and the abutment $g^3$ will not be at a constant acute angle to the axis of the work in cutting peripheral portions of different diameters. The templet has the straight side faces $h'$ and $h^2$, and the inclined face $h^3$, the latter being of such length and at such angle that the point of the cutter will move at the proper angle to the work axis, as the slide travels and the tool swings about its pivot, to form the shoulder or cut the face $f^3$ of the work. This will readily be understood without detailed explanation, the tool being shown by dotted lines in several positions. The tool moves freely longitudinally of its length (i. e. longitudinally of a line connecting the abutment and the nose of the cutter) under control of the templet, the guiding means in this case, comprising the lateral arm of the tool and the pivot by which it is connected to the tool slide.

It will be understood from the foregoing that the invention may be embodied in many different forms of metal working machines whether they reduce the work by grinding or by cutting.

In Figs. 1 to 5 inclusive, I have illustrated a portion of an engine lathe in which the invention is embodied, merely to illustrate an example of how the invention may be used in reducing the work by a cutting operation. The main features of the lathes are well known and may be referred to briefly. The headstock has the spindle 10 by which the work is held and rotated, and 11 is the tailstock center. On ways on the bed 12 is mounted the tool slide 13 which is reciprocated longitudinally of the bed by any usual or suitable mechanism which I need not describe. Secured to the bed by any convenient means is a templet 14 which extends lengthwise of the work 15. This templet is formed with the longitudinal and transverse faces to correspond to the relative diameters and shoulders of the finished work. The tool slide is formed on its top with an undercut guide, 16, which is arranged at an acute angle of approximately 45° to the work axis, the templet and the path of movement of the tool slide. A tool holder or carrier 17 is arranged to slide freely on the guide and is provided on its inner end with means for receiving and securing a cutter 18. The carrier is slotted and in the slot 19 is located an abutment block 20 whose rear end is in the horizontal plane of the templet as shown in Fig. 4. Said rear end has faces corresponding to those at $d'$, $d^2$ in Figs. 6 and 7. A screw bar 21 is journaled in the cutter carrier and is in threaded engagement with the abutment block, so that by its rotation the block may be adjusted to vary the distance between the nose of the cutter and the end faces of the block. It is immaterial whether the block be adjusted relatively to the cutter, or the cutter be adjusted relatively to the block, but one or the other should preferably be adjustable so that the nose of the cutter can be crossfed for cuts of different depths. The block is shown as held in place by gibs 22. In the arrangement shown, the templet is located above the tool carrier so that the latter may be reciprocated beneath it. It will be understood that the templet may easily be made adjustable either transversely or longitudinally of the path of movement of the tool slide, but the provision of means for such adjustment is clearly within the province of a mechanic, and need not be herein illustrated or described.

For the sake of simplicity of phraseology, I may term the cutter, the cutter holder, and the abutment block, a "tool," since these parts are all normally connected together rigidly to move as a unit, although they are capable of relative adjustment.

The operation of the machine is the same as that previously described, the tool having the same relative bodily movements under control of the templet as those which I have hereinbefore set forth at length. When the cutter is turning a peripheral portion of the work, the tool is being moved bodily in lines at an acute angle to its median line; but, when a shoulder or face on the work is reached, the tool moves not only relatively to the carriage in lines longitudinal of the median line of the tool, but also bodily in lines parallel to the transverse faces of the templet and at an angle to the median line of the tool itself. I have applied to Fig. 1, so far as the same are applicable, the same reference letters which I employed in connection with Figs. 6 and 7, so that the description of the last-mentioned figures will apply to the mechanism shown in Fig. 1.

It will be apparent to those who read this specification that the details of construction which I have illustrated and described are not essential to the invention, and that the phraseology which I have adopted is for the purpose of description and not of limitation.

Having thus explained the nature of my said invention, and described a way of making and using the same, although without attempting to set forth all of the forms in which it may be made or all of the modes of its use, what I claim is:

1. A metal working machine comprising a work holder, a reciprocatory tool slide, a templet longitudinal of the path of movement of the tool slide, and a tool arranged on the slide at an acute angle to the templet and between the templet and the slide and freely movable longitudinally of its length on said slide under control of the templet.

2. In a metal working machine, means for reducing peripheral and face portions of the work, comprising a reciprocatory tool slide, a stationary shouldered templet arranged longitudinally of the path of movement of the slide, a tool abutting against the templet and arranged at an acute angle thereto, and guiding means on the slide for permitting said tool under control of the templet to move longitudinally of its length relatively to the slide during the reciprocation of the slide.

3. In a metal working machine, a work holder, and means for reducing the peripheral and face portions of the work, comprising a shouldered templet, a tool held against the templet and arranged between the templet and the work, and a reciprocatory tool slide having a guideway for the tool at an acute angle to the templet.

4. In a metal working machine, a main frame, a rotatable work holder, a tool slide arranged to reciprocate on the frame longitudinally of the axis of the work holder, a stationarily mounted templet having one or more angular shoulders and longitudinal guides surfaces, and a tool arranged at an acute angle to the templet between the latter and the work, and slidingly bearing at its outer end against said templet, said tool being mounted on said tool slide to move longitudinally of its own length, in consequence of which it may cut square or right angle shoulders on the work.

In testimony whereof I have affixed my signature, in presence of two witnesses.

GEORGE O. GRIDLEY.

Witnesses:
BESSIE M. SKINNER,
C. F. GULLIVAN.